United States Patent
Lo et al.

(10) Patent No.: US 6,925,134 B1
(45) Date of Patent: Aug. 2, 2005

(54) SYSTEM AND METHOD FOR SIGNAL SYNCHRONIZATION IN A COMMUNICATION SYSTEM

(75) Inventors: Chiaming Lo, Irvine, CA (US); Robert Joseph McCarty, Rockwall, TX (US)

(73) Assignee: CynTrust Communications, Inc., Dallas, TX (US)

( * ) Notice: Subject to any disclaimer, the term of this patent is extended or adjusted under 35 U.S.C. 154(b) by 0 days.

(21) Appl. No.: 09/561,706

(22) Filed: May 1, 2000

Related U.S. Application Data (63) Continuation-in-part of application No. 09/295,660, filed on Apr. 21, 1999.
(60) Provisional application No. 60/107,934, filed on Nov. 11, 1998.

(51) Int. Cl.[7] .............................. H04L 7/00; H04L 7/06
(52) U.S. Cl. ....................................... 375/354; 375/364
(58) Field of Search .............................. 375/261, 354, 375/355, 359, 362, 363, 364, 356, 358, 365, 368, 262, 263, 264, 265, 326, 343, 344; 370/347, 509; 332/103

(56) References Cited

U.S. PATENT DOCUMENTS

| | | | | |
|---|---|---|---|---|
| 5,343,498 A | * | 8/1994 | Toy et al. ..................... | 375/37 |
| 6,052,423 A | * | 4/2000 | Blois et al. .................. | 375/355 |
| 6,154,483 A | * | 11/2000 | Davidovici et al. ......... | 375/130 |
| 6,160,821 A | * | 12/2000 | Dolle et al. .................. | 370/509 |
| 6,185,259 B1 | * | 2/2001 | Dent ........................... | 375/261 |
| 6,252,910 B1 | * | 6/2001 | West et al. ................... | 375/261 |
| 6,295,290 B1 | * | 9/2001 | Soderkvist et al. ......... | 370/347 |
| 6,320,919 B1 | * | 11/2001 | Khayrallah et al. ......... | 375/347 |
| 6,362,701 B1 | * | 3/2002 | Brombaugh et al. ........ | 332/103 |
| 6,430,235 B1 | * | 8/2002 | O'Shea et al. .............. | 375/326 |

* cited by examiner

*Primary Examiner*—Young T. Tse
*Assistant Examiner*—Sam K. Ahn
(74) *Attorney, Agent, or Firm*—Slater & Matsil, L.L.P.

(57) ABSTRACT

A system and method for information content-independent synchronization with a received signal. A variable of the signal (e.g., average energy or magnitude) which is related to the energy distribution, is measured over a period of time. The signal's information bearing point is found at the point within the information period of the signal with the highest averaged energy. The point may be found, for example, by detecting the sample point with highest average energy, or by correlating multiple sample points to a stored template. Interpolation may be performed to locate an information bearing point that is between sample points. Because the relative energy content of the signal is effectively independent of the specific information content, synchronization with the information bearing point is accomplished without requiring the insertion of any special information content or fixed content patterns into the signal.

18 Claims, 4 Drawing Sheets

SYSTEM AND METHOD FOR SIGNAL SYNCHRONIZATION IN A COMMUNICATION SYSTEM

This application is a continuation-in-part of Ser. No. 09/295,660, filed Apr. 21, 1999, entitled BANDWIDTH EFFICIENT QAM ON A TDM-FDM SYSTEM FOR WIRELESS COMMUNICATIONS which claims the benefit of U.S. provisional application No. 60/107,934, filed Nov. 11, 1998, which Ser. No. 09/295,660 application is hereby incorporated herein by reference.

CROSS-REFERENCE TO RELATED APPLICATIONS

This application is related to the following co-pending and commonly assigned patent applications: Ser. No. 09/302,078, filed Apr. 28, 1999, entitled IMPROVED NYQUIST FILTER AND METHOD; and Ser. No. 09/450,487, filed Nov. 29, 1999, entitled METHOD AND APPARATUS FOR TRACKING THE MAGNITUDE OF CHANNEL INDUCED DISTORTION TO A TRANSMITTED SIGNAL; all of which applications are hereby incorporated herein by reference.

TECHNICAL FIELD

The present invention relates generally to communications, and more particularly to synchronization to a sampled signal in a communication system.

BACKGROUND

Wireless communications are becoming more popular as technology develops. Many people are now communicating through mobile telephones, pagers, radio frequency ("RF") devices and others. As this trend toward heavier usage of the frequency spectrum continues, there is an ongoing need to optimize the communication channels between the communication units in wireless telecommunications systems.

One optimization issue that arises with wireless communications is the need to maximize the throughput or utilization of a communication channel. For example, in the United States, the Federal Communications Commission ("FCC") has allocated only a limited portion of the frequency spectrum for trunked private two-way RF communication. The reserved portion of the spectrum is divided into predefined frequency channels. Each communication channel generally requires a certain amount of available bandwidth to transmit substantive information (e.g., data, audio, video, multimedia, or some combination). Other factors being equal, the more of the transmitted signal that is used for the transmission of substantive information, the more efficient the utilization of the allocated bandwidth. In addition to the substantive information, however, there is also a certain amount of overhead information that typically must be transmitted in the communication channel.

One type of overhead information is control information that is exchanged between the communication units. For example, in a mobile telephone communication system, a base unit and terminal unit may exchange control information such as power control instructions, packet length arbitration, system ID information, service option, frequency, channel, gain, error, checking, and the like.

Another type of overhead information is synchronization information. Synchronization is generally utilized in coherent communications systems, wherein a unit that is initially operating asynchronously with respect to another unit is required to synchronize with the signals transmitted by the other unit. To synchronize, a receiving unit generally determines the timing of the information in a signal transmitted by a transmitting unit, and synchronizes its processing with the timing of the transmitted information. For example, in a mobile telephone communication system, a base station (or central cell or master or repeater) transmits a communication signal. Generally, a terminal unit (or roaming unit or subscriber unit) within range of the base station must acquire the transmitted signal before information can be exchanged. The terminal unit is initially operating asynchronously, and is not synchronized with the transmitted signal. As part of the signal acquisition process, the terminal unit generally has to align its frequency and timing with the transmitted signal.

In the prior art, specific synchronization information is generally inserted into the transmitted signal by the transmitting unit. The receiving unit uses this known synchronization information to determine the best timing at which to sample the incoming signal. Synchronizing with the incoming signal generally results in the receiving unit sampling at the timing interval at which there is the least interference from neighboring signals, thus establishing a reliable communication channel.

A prior art receiving unit typically uses a feedback loop to vary the frequency of its crystal oscillator to change the sample time until a signal lock is raised. The specific synchronization information of the prior art generally consists of a fixed symbol pattern in the transmitted signal. The receiver searches for these synchronization symbols by decoding the sampled potential symbol points into bits, and performing correlation over a large portion of the sampled signal until a symbol pattern in the sampled signal matches the fixed symbol pattern.

A problem with prior art systems is that the synchronization symbols are overhead information, and utilize part of the available bandwidth in the communication channel. This reduces the amount of bandwidth available for the transmission of substantive information, and thus reduces the maximum throughput of substantive information in the communication channel.

Another problem in the prior art is that the synchronization symbol values and patterns generally must be predetermined and programmed into both the transmitting unit and the receiving unit to enable the receiving unit to search for the same synchronization symbols that the transmitting unit is actually sending.

Because the synchronization symbols are inserted only periodically into the transmitted signal, another problem in the prior art is that the receiving unit generally only uses a small portion of the incoming signal for calculating the proper synchronization time, while the rest of the transmitted signal does not provide usable synchronization information. Thus the receiving unit may have to monitor the incoming signal over a significant period of time in order to receive sufficient information for synchronization.

SUMMARY OF THE INVENTION

These problems are generally solved or circumvented, and technical advantages are generally achieved, by a system and method for information (e.g., symbol) content-independent synchronization. Generally, a communication signal filters a signal at some point (or at multiple points) during transmitter and receiver processing. In particular, a pulse shaping filter may be implemented for a variety of reasons, including limiting the overall bandwidth of the signal, minimizing the effects of noise, and reducing stop band energy. A preferred embodiment of the present invention takes advantage of a property of pulse shaping filters, specifically, that the relative energy distribution of the output waveform with respect to the information bearing point of the signal is determinable. For example, the information bearing point in the signal is at or near the point having the highest average energy. A preferred embodiment of the present invention thus measures a variable of the signal (e.g., magnitude), which is related to the energy distribution, and uses this variable to determine the signal's information bearing point.

In addition, for purposes of the preferred embodiments of the invention, the average relative energy content of the signal is independent of the specific symbol values or information content in the signal. By measuring a variable of the incoming signal that is generally independent from specific symbol values, the preferred embodiments of the present invention are able to synchronize with a signal without requiring the insertion of any special symbols or fixed symbol patterns into the signal for synchronization.

In accordance with a preferred embodiment of the present invention, a method comprises receiving a transmitted signal, wherein the signal comprises a periodic information bearing point at an information rate and wherein an information period is the inverse of the information rate; sampling the transmitted signal at sample points at a sampling rate greater than the information rate, wherein a sample period is the inverse of the sample rate; filtering the signal with a pulse-shaping filter, measuring a variable of the signal at the sample points, wherein the variable is independent of information content in the signal; determining the location of the information bearing point in the signal based on the information content-independent variable; and synchronizing processing of the signal with the information bearing point.

In accordance with another preferred embodiment of the present invention, a system capable of synchronizing with a received signal comprises an analog-to-digital converter receiving an information signal, wherein the signal comprises a periodic information bearing point at an information rate and wherein an information period is the inverse of the information rate; a pulse-shaping filter coupled to receive a digital signal from the analog-to-digital converter, wherein the digital signal comprises sample points at a sampling rate greater than the information rate and wherein a sample period is the inverse of the sample rate; and a synchronization unit coupled to receive a pulse-shaped sampled signal from the filter. The synchronization unit comprises a detector determining values of a variable of the signal at the sample points, wherein the variable is independent of information content in the signal; an accumulator for accumulating the detected values for each of the sample points which occurs at the same relative sample location within each information period, wherein there are (sample rate)/(information rate) sample locations within each information period; sample bins for storing the accumulated values for the sample locations; and a comparable for comparing the accumulated values in the sample bins, wherein the location of the information bearing point in the signal is determined based on the accumulated information content-independent values.

An advantage of a preferred embodiment of the present invention is that symbol synchronization may be accomplished in a blindly adaptive manner. That is, a receiving unit does not need to know any information about the actual values of the transmitted symbols in order to synchronize to the signal.

A further advantage of a preferred embodiment of the present invention is overhead information is reduced. No special symbols or symbol patterns are required for symbol synchronization, because a symbol value-independent variable (e.g., peak average energy) is used for synchronization. The bandwidth for substantive information in a channel is thus increased.

A further advantage of a preferred embodiment of the present invention is that symbol synchronization may be accomplished more quickly than with prior art methods. because information from all incoming symbols is used for synchronization. A receiver does not need to wait for the proper time in the symbol sequence for special synchronization symbols. In addition, continuous synchronization may be performed to keep track of variations in the transmitted signal due to, e.g., component drift.

Yet another advantage of a preferred embodiment of the present invention is that multiple sampled points around a symbol may be used (e.g., with template matching), thus allowing faster and more accurate symbol synchronization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to a specific content, namely a trunked radio system utilizing quadrature amplitude modulation ("QAM"). The invention also applies, however, to other types of communications systems, such as cellular telephones (digital and analog), microwave communications, satellite communications, and others. In particular, the invention will be discussed with respect to the system disclosed in co-pending patent application Ser. No. 09/295,660, filed Apr. 21, 1999, entitled BANDWIDTH EFFICIENT QAM ON A TDM-FDM SYSTEM FOR WIRELESS COMMUNICATIONS.

Figure 1:
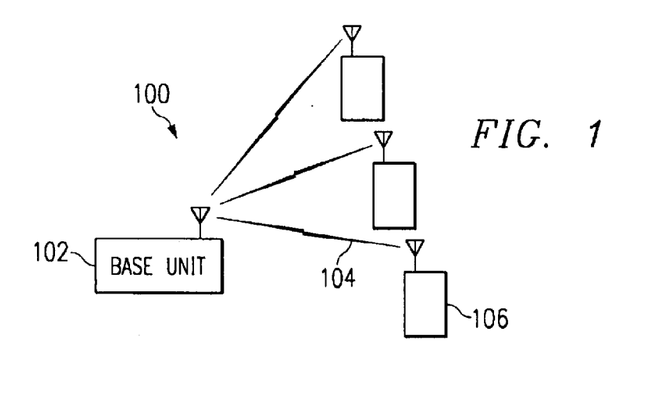
FIG. 1 is a block diagram of a preferred embodiment radio system.

FIG. 1 illustrates an exemplary radio system 100. System 100 could be a cellular telephone system, a two-way radio dispatch system, a localized wireless telephone or radio system or the like. Base unit 102 can communicate over transmission medium 104 to one or more terminal units 106. Transmission medium 104 in this example represents the wireless communication spectrum. Terminal units 106 can be mobile units, portable units, or fixed location units and can be one-way or two-way devices. Although only one base unit is illustrated, radio system 100 may have two or more base units, as well as interconnections to other communication systems, such as the public switched telephone network, the internet, and the like.

In the preferred embodiment, the system provides for full duplex communications. The teachings of the present invention, however, apply to half duplex systems, as well as to time division duplex, simplex and other two-way radio systems. In some preferred embodiments, each base unit 102 transmits on only a single (e.g., 25 kHz bandwidth) frequency channel. Hence for a system that is licensed to operate on ten channels, ten base stations would be required. In alternative embodiments, the base station can be configured to transmit and receive across multiple channels. This feature would be particularly beneficial for those systems which are licensed to operate across several contiguous channels.

In the preferred embodiment, the system uses two-ring differential QAM with a 16 point constellation and Gray coding for signal encoding. The teachings of the present invention, however, apply to other modulation schemes, such as three-ring QAM, star QAM, square QAM, coherent QAM, phase shift keying ("PSK"), differential PSK ("DPSK"), and the like.

Figure 2:
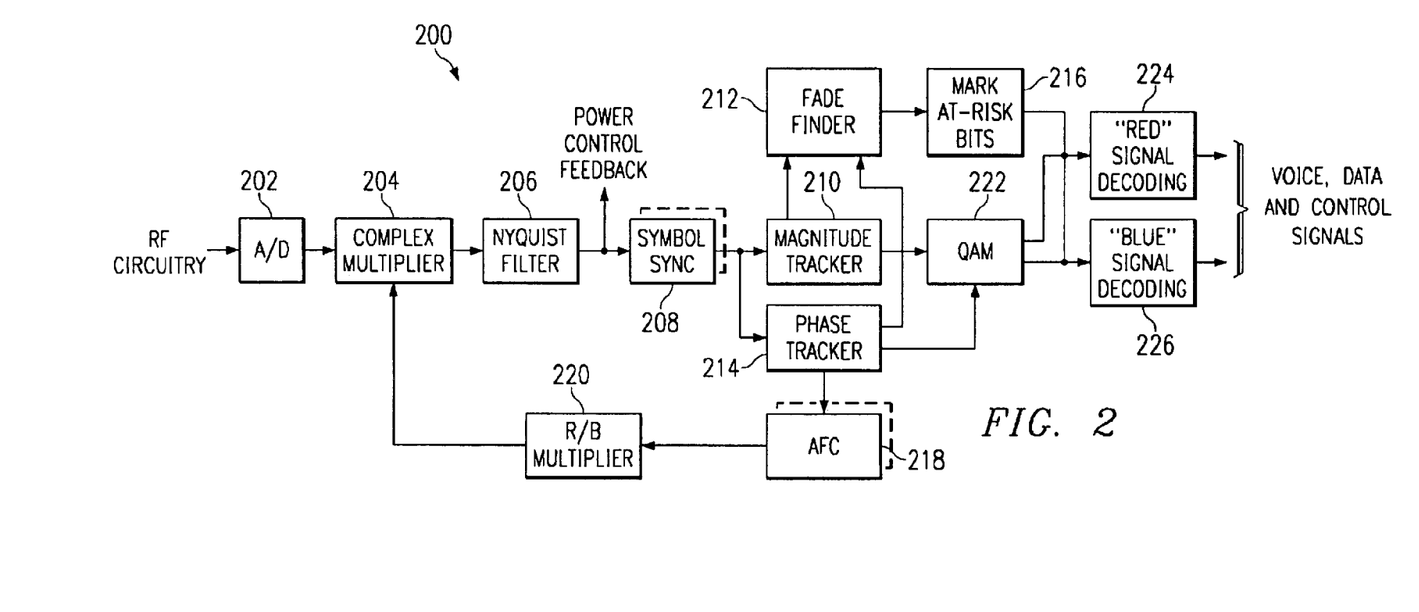
FIG. 2 is a block diagram of a preferred embodiment base unit.
Figure 3:
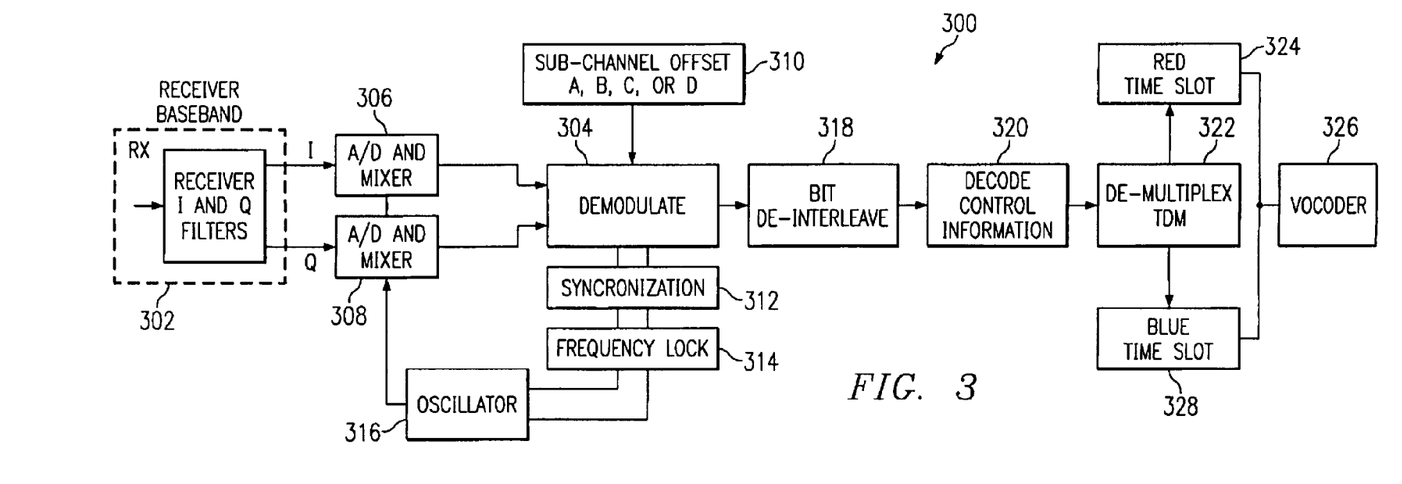
FIG. 3 is a block diagram of a preferred embodiment terminal unit in receiving mode.

Details of portions of the base unit and terminal units illustrated in FIG. 1 are provided in the following descriptions. FIG. 2 is a block diagram of base unit 102 operating in receiver mode, while FIG. 3 is a block diagram of terminal unit 106 operating in receiver mode. A skilled practitioner will note that several components of a typical ratio transmitter/receiver not necessary to an understanding of the invention have been omitted.

FIG. 2 is a block diagram of receiver 200 in base unit 102. Signals from terminal units 106 are received by RF receiving circuitry (not shown). A/D converter 202 receives the signal from the RF receiving circuitry and converts it to a digital signal, which is fed to one or more sub-channel paths. A detailed discussion of the sub-channel paths is provided in patent application Ser. No. 09/295,660. Complex multiplier 204 removes the frequency offset corresponding to a particular sub-channel from the incoming signal. The signal is then frequency channelized by the square root Nyquist matched filter 206.

The filtered signal is passed to symbol synchronization block 208, which calculates the proper sapling point where there exists no (or minimal) inter-symbol interference signal. As disclosed by patent application Ser. No. 09/295,660, that is accomplished by calculating the magnitude of the sample points over time and selecting the highest energy points (corresponding to the synchronized symbol sample points). The signal is then passed on to magnitude tracking block 210 and to phase tracker 214. A detailed discussion of the remainder of the base unit receiver circuitry, including blocks 218–226, is provided in patent application Ser. No. 09/295,660.

FIG. 3 is a block diagram of receiver 300 in terminal units 106. Signals from the base unit or another terminal unit are received by RF receiving circuitry 302 where the RF signal is down-converted and filtered before being passed to A/D converter and mixer 306 for the in-phase ("I") component and 308 for the quadrature ("Q") component. Also at this point, the frequency offset associated with the sub-channel selection is removed from the signal components by mixing into the received signal a signal complementary to the offset signal. The complementary offset signal is determined by sub-channel frequency offset control information, as illustrated by clock 310 and depends on the sub-channel upon which the terminal unit is receiving. The digital signals are then demodulated to a real binary signal in demodulator 304. The digital binary signal is then de-coded and further processed in blocks 318–328 as described in the disclosure of patent application Ser. No. 09/295,660.

Slot and symbol synchronization is provided for in synchronization block 312. Symbol synchronization is performed first. As disclosed by patent application Ser. No. 09/295,660, symbol synchronization is accomplished by sampling the incoming signal and time averaging the samples. Then the sample points with the highest average power at the over-sample rate are detected. Preferably, the actual sample point is determined using a quadratic interpolation based on the three sample points with the highest average power. Symbols can then be identified using known digital signal processing techniques. Once the receiver has synchronized on the symbol time and locations, slot synchronization is accomplished using slot sync symbols, by identifying patterns representing the known sync symbols, which should repeat every 120 symbols (i.e., every slot or time frame).

Figure 4A:
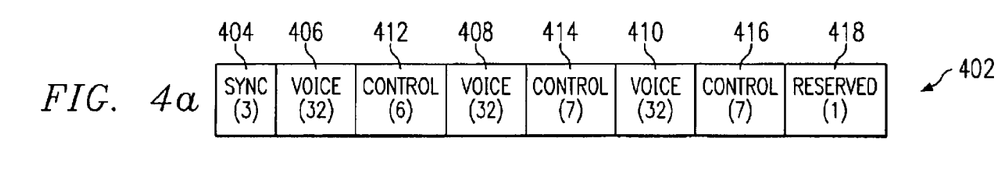
FIGS. 4a and 4b illustrate the organization of a single forward time slot of information and a single reverse time slot of information, respectively.
Figure 4B:
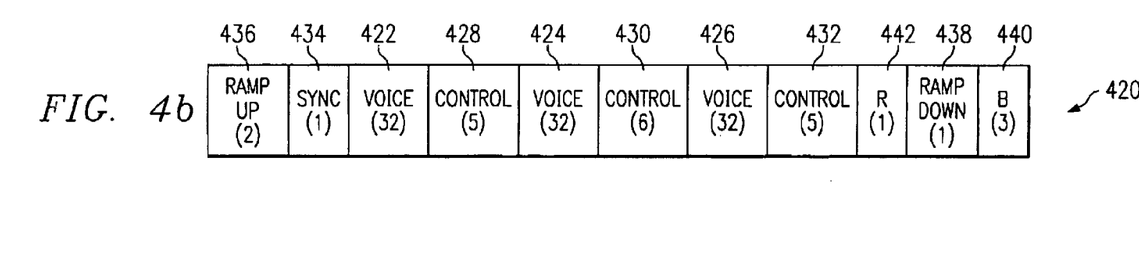

The control and synchronization signals as disclosed by patent application Ser. No. 09/295,660 are illustrated in FIGS. 4(a) and 4(b). FIG. 4(a) illustrates the structure for a single time slot 402 on the forward channel, i.e., transmitted from the base unit to a terminal unit. Time slot 402 is logically divided into sync, control, and voice portions. Each outbound (i.e., forward channel) time slot begins with a synchronization portion 404 to allow for timing synchronization between the base and terminal unit(s). In the preferred embodiment, sync portion 404 is three symbols long. Each symbol is preferably associated with four bits of data. The value of each symbol is determined by the phase and amplitude change between the time of the impulse within a symbol period and the time of the impulse one symbol period later. Alternatively, the value of each symbol could be determined by the absolute phase and amplitude at a particular point within the symbol period. The former technique is known as differentially incoherent modulation and the latter as coherent modulation.

Each symbol period is preferably about 250 $\mu$s in duration. As such, 120 symbols can be transmitted during the 30 ms time slot 402. Voice or data is transmitted during the voice portions of the time slot 406, 408, and 410. Each voice portion transmits 32 symbols of information, as indicated by the numbers in parentheses. Control signals are interleaved with the voice information, as shown by control portions 412, 414, and 416, providing a total of 20 symbols of control information per slot. Finally, a one symbol portion of the slot 418 is reserved for future needs.

The first data symbol value (in the case of time slot 402, the first voice symbol of voice portion 408) will be equal to the phase and amplitude change between the impulse time of the last symbol period of sync portion 404 and the impulse time of the first symbol of voice portion 406. The last symbol will be equal to the phase and amplitude change between the $119^{th}$ impulse time and the $121^{th}$ pulse time. A base generated time slot 402 begins with the first impulse and ends immediately before the $121^{th}$ impulse, which is the first amplitude of the next time slot. In the event there is no information (voice or data) to be transmitted, a pseudo-random pattern will be inserted into the voice portions of the slot and transmitted along with control signals. Note that for purposes of demonstrating the logical structure, voice and control symbols are shown separately. In actual practice, prior to transmission, the voice and control bits are inter-leaved prior to QAM modulation, such that voice bits and control bits can be interleaved in the same symbol for transmission.

FIG. 4(*b*) illustrates the organization of a time slot 420 transmitted by a terminal unit, as disclosed by patent application Ser. No. 09/295,660. As with the base unit generated time slot, time slot 420 is 30 ms long, providing for 120 symbols of 250 µs duration. Voice portions 422, 424, and 426 are interspersed with control portions 428, 430, and 432. Time slot 420 provides for a one symbol long sync portion 434. The first data symbol for time slot 420 will be equal to the phase and amplitude change between the last sync impulse of sync portion 434 and the first impulse of voice portion 432. The last data symbol will be the phase and amplitude change between the second to last and last impulses of voice portion 426.

As discussed above, a terminal unit transmits only during its assigned time slot, then turns its transmitter off. Time slot 420 provides for a ramp up period 436 of two symbols duration and a ramp down portion 438 of one symbol period duration. The ramp periods are used to control out-of-band energy and to allow the terminal unit to stabilize after the transmitter is turned on prior to transmitting during the time slot and to avoid signal degradation due to the effects of the transmitter beginning to power off at the end of the time slot. Further protection is provided by a bank portion 440 of three symbol periods duration to compensate for propagation delay at the end of the time slot (i.e., to ensure that a signal received from a far removed terminal does not overlap with the signal received from a near by terminal due to the differing propagation delays associated with the near and far terminals) Due to these signal ramp up and dead symbol periods, a terminal generated time slot will not begin and end with a symbol period that contains an impulse. Ideally, a time slot generated by a terminal unit will begin at the same time as the base unit generated time slot and the impulses generated by the terminal unit will be coincident with impulses generated by the base unit. Propagation delays, however, prevent this ideal alignment. For this reason, sync symbols are inserted in the terminal unit signals. Additionally, time slot 420 has a reserved portion 442 of one symbol duration for further expansion. In some preferred embodiments, the reserved symbols 418, 442 are used for additional symbol synchronization control. In the currently preferred embodiment, reserved symbol 442 is used for a ramp down signal. Alternatively, the specific symbol types and order within a transmit or received slot may be changed depending on the application.

Returning now to FIG. 2, and in particular to Nyquist filter 206 in FIG. 2, the information-bearing point in the output of pulse shaping Nyquist filter 206 is the point in the signal with minimum inter-symbol interference. Patent application Ser. No. 09/302,078, filed Apr. 28, 1999, entitled IMPROVED NYQUIST FILTER AND METHOD, provides a detailed discussion of the properties and implementation of Nyquist filters in a communications system. However, any type of Nyquist filter may be used with the present invention, including a raised cosine filter or other filters such as those disclosed in patent application Ser. No. 09/302,078.

Figure 5:
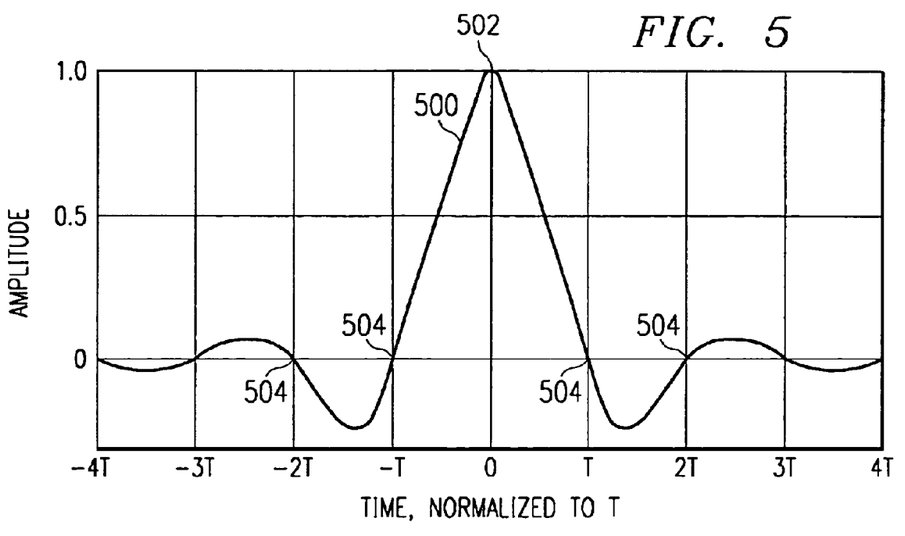
FIG. 5 is a plot of the impulse response of a pulse shaping filter.

In a preferred embodiment, the pulse shaping filter uses a pair of matched filters, one for transmit and one for receive. The convolution of the transmit filter with the receive filter forms the complete pulse shaping filter. Inter-symbol interference is generally avoided because the combined filter impulse response reaches unity at a the information bearing point and is zero periodically at every other information point (Nyquist sampling rate). FIG. 5 illustrates an example of Nyquist filter impulse response 500. Peak 502 occurs at the information bearing point, and zeros 504 occur at the other points at the information rate. At a point in the signal other than the information bearing point, the output waveform from the Nyquist filter may have associated with it the energy of perhaps five to ten symbols. Generally, only at the information bearing point is the energy of output waveform from the Nyquist filter associated with only one symbol. In addition, it is at this point that the signal has the highest energy, on average.

Therefore, in a preferred embodiment, symbol synchronization block 208 determines the single sample point that has the highest energy, on average. This point represents the information bearing sample point, allowing synchronization to the signal. Fixed symbol values or patterns are therefore not required for symbol synchronization.

Preferably, the variable used to measure the average energy of the waveform is the sum of the squares of the I and Q components. Alternatively, magnitude or any other variable that approximates signal energy may be used. In addition, the energy of either the I or Q component by itself may be used.

A specific example using the sum of the squares of I and Q will now be discussed. Receive square root Nyquist filter 206 samples at a 52 kHz rate, while the information symbol rate is only 4 kHz in the preferred system. This results in thirteen samples for every symbol. One of the oversampled points is nearest the correct information bearing sample point. Note that at acquisition nothing is known about timing, and the information bearing time point may not lie at a sample boundary time, but be between two sample times.

To accomplish the averaging process, the magnitude squared at every sample is calculated and thirteen samples per symbol period are accumulated. The sample point with the largest accumulated value represents the sample closest to the information-bearing symbol time. The symmetry of the pulse-shaping filter is also exploited to give a subsample time estimate of the information-bearing time point. A quadratic fit is used to interpolate to the optimum sampling time. The equation for the magnitude squared is:

$$MAG_i = (I_i^2 + Q_i^2)$$

The accumulation over a 120 symbol slot is performed by:

$$\text{SUM\_MAG}_k = \sum_{j=0}^{1559} (I_{k+13j})^2 + (Q_{k+13j})^2,$$

where k varies 0 to 12

Preferably, the process is repeated and summed for 16 slots, although longer or shorter summation periods may be used. This results in 13 bins of sample information collected over a total of 16 slots, each bin representing the average energy of the signal at a particular sample interval within the information interval. The largest SUM_MAG value represents the sample point nearest the information-bearing time point. In a preferred embodiment, the total accumulated values are used to represent the average energy. Alternatively, each total value could be divided by the number of samples taken for each bin, but this is generally not necessary because the average energy is a relative quantity from one sample bin to the next.

Preferably, a quadratic fit is used to further refine the symbol time estimate. The fit is performed as follows:

Let M denote the index of the symbol with the highest magnitude squared, so that SUM_MAG represents the highest sum. The interpolated index in terms of samples and fractions of a sample becomes INTER_VAL=M−b/2$_a$, with $$b = (\text{SUM\_MAG}_{m-1} - \text{SUM\_MAG}_{m-1})/2$$

$$a = (\text{SUM\_MAG}_{m-1} + \text{SUM\_MAG}_{m+1})/2 - \text{SUM\_MAG}_m.$$

It may occur that M is an end point (0 or 12) of the SUM_MAG array. If M=12, then SUM_MAG$_{m+1}$=SUM_MAG. If M=0, then SUM_MAG$_{m-1}$=SUM_MAG$_{12}$. The SUM_MAGs array is interpreted in a modulo 13 fashion. Generally, for acquisition, it is important only to align to one of the correct sampling times (modulo 13) since nothing has been determined for slot alignment up to this step in the acquisition process.

The algorithm uses the value INTER_VAL to interpolate between samples to obtain an estimate of the symbol value time. Quadratic interpolation places the index of the symbol value between M−1 and M or between M and M+1. Both the in-phase and quadrature-phase values are interpolated.

The interpolation for I and Q has the following form. If the index of the interpolated value is between M−1 and M+1 samples, the interpolated value is constructed by truncating to the lower integral sample value (which is N,N=integer value of INTER_VAL,DELT is fractional part of INTER_VAL). The residual denoted by DELT is then used to interpolate the data by:

$$I_{IN} = (1-DELT)I_N + DELT\, I_{N+1},$$

$$Q_{IN} = (1-DELT)Q_N + DELT\, Q_{N+1},$$

where N can be either M or M−1, and subscript 'IN' denotes interpolated value.

Figure 6:
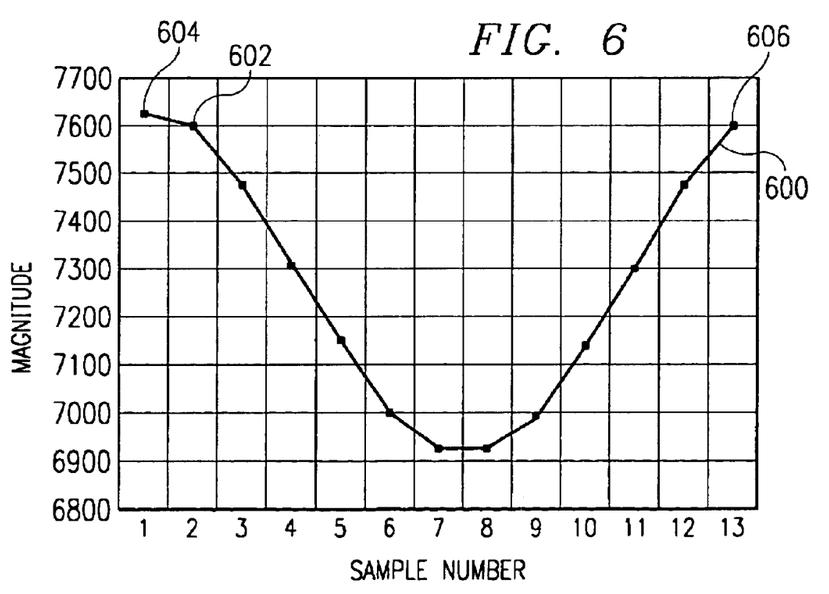
FIG. 6 is a plot of magnitude versus sample number as used by a preferred embodiment of the present invention.

FIG. 6 illustrates simulated plot 600 representing magnitude squared versus sample bin number. In this example, the highest energy point is first sample point 604. Sample points 602 and 606 are the next highest sample points. After performing a modulo 13 quadratic fit calculation on sample points 602, 604 and 606, the interpolated value would fall on an exact sample boundary point, sample point 604. Alternatively, for other sample point values, the interpolated value may occur between sample points, and not on a boundary. Although the preferred embodiment utilizes a quadratic interpolation, any other curve estimating algorithm may be used, such as a polynomial equation using more sample points, or a template matcher may be used.

Although synchronization must be maintained during the time that the communication channel is being utilized, subscriber units generally are not manufactured to the same tolerances as the repeater, and they tend to drift. Therefore the same synchronization process is preferably repeated over and over in a continuous process. Preferably 16 slots worth of samples are binned up and the synchronization is calculated, then the next 16 slots worth of samples are binned up, and the synchronization recalculated. Alternatively, synchronization could be performed at periodic intervals. As another alternative, if high quality oscillators are used, synchronization could be performed only once at acquisition, or a limited number of times. As another alternative, the sample measuring periods for different synchronization could overlap with each other. An averaging filter might also be used on multiple synchronization results. As yet another alternative, the number of sample bins or the total number of samples could be varied.

A preferred method of using the estimated information time point is to reset a counter every sixteen slots when a new estimate is made. The counter preferably enables sampling to synchronize the input data stream to the Nyquist filter. The receive Nyquist matched filter is generally only well matched at points where the information time point occurs at a sample point, and is not as well matched between two sample points. Thus, interpolating between two sample points to get symbol information may lead to some system degradation when compared to sampling at the correct time point. In one embodiment, the acquisition symbol synchronization algorithm may run continuously on the received data stream, while the steady state symbol synchronization algorithm may run on every other slot.

As discussed above, with a pulse shaping filter the energy variation on average along the entire waveform is determinable. Accordingly, a template matching algorithm may be used in another preferred embodiment. Alternatively, both peak average energy detection and template matching may be used. In practical use, a terminal unit generally does not have to acquire the base unit as quickly as the base unit must acquire the terminal unit. This is because typically a terminal unit is powered on and begins searching for a base unit. The time spent finding and synchronizing with a base unit is not time critical. However, once a connection is made and a user initiates a transmit signal from the terminal unit to the base unit, the base unit must synchronize with the terminal unit very quickly to establish the full communication channel.

In a preferred embodiment for the terminal units, only the peak average energy detection algorithm is used. In a preferred embodiment for the base unit, the template matching algorithm is used during initial signal acquisition, and then the base unit switches over to peak average energy detection. This is because the template matching approach is generally faster and more accurate than the peak average energy detection approach.

Template matching makes use not only the point with the highest average energy, but multiple or even all of the energy points, because the template matcher assumes that the entire waveform has a certain energy distribution, on average. With the template matching approach, the 13 measured sample bins are run across the template as a sliding window to determine the best correlation between the measured data and the template. The mean of the measured data is subtracted to normalize for the correlation. The point in the correlation that has the highest correlation peak is the point in the waveform at which the measured samples align with the template. A quadratic fit is still preferably performed to interpolate between sample points, as with the peak energy approach.

The template approach is generally faster than peak detection because it uses 13 times the information, and thus not as many sample points are needed to arrive at a valid correlation. The template approach is also generally more accurate than peak detection because any local errors in the measured data are mitigated by comparing all 13 sample points to the template at once.

In a preferred embodiment, the template is pre-computed and stored. It has 26 points; which is twice the number of bins of measured data (i.e., 13). In this way the sliding window of 13 bins will always match up at some point in the template, no matter at which sample point the measurement starts. Alternatively, a partial template containing only a portion of the waveform may be used, for example, centered about the highest average energy point.

Figure 7:
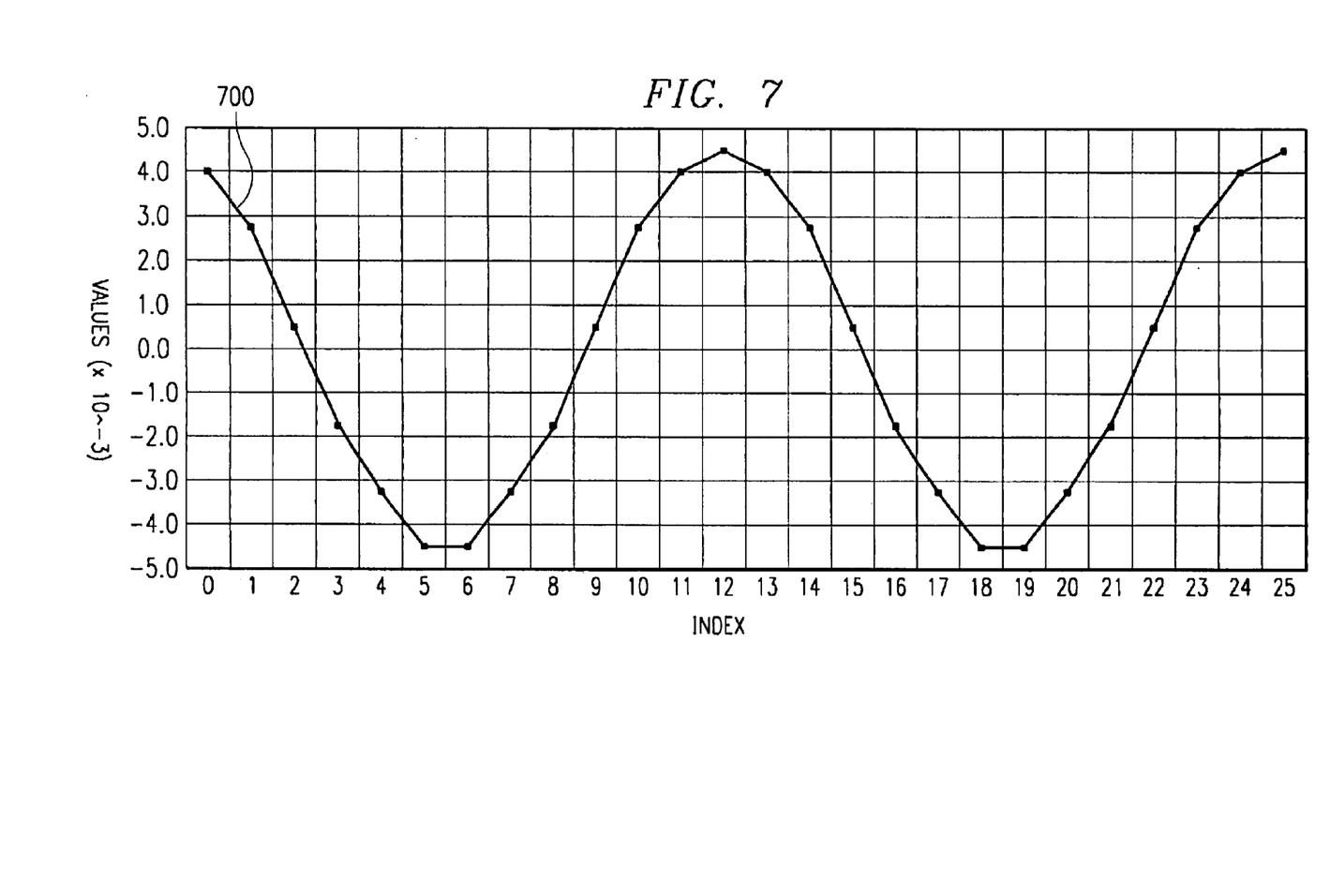
FIG. 7 is an energy matching template as used by a preferred embodiment of the present invention.

A specific example of a template matcher will now be described. In a preferred embodiment, at the end of the slot, a template match is used to refine the estimate of symbol synchronization. The initial 20 symbols allow a coarse estimate of symbol synchronization to be made, so that the trunking/control data can be decoded. The end-of-the-slot template match allows a more refined estimate of symbol synchronization to be made, based on all the received data. The estimate is then used for the next slot of received data. FIG. 7 illustrates the template.

To use template 700 shown in FIG. 7, the magnitude squared at every sample is calculated, and thirteen samples per symbol period are accumulated. The accumulation is accomplished over the acquisition (special) slot/slots (two are possible). Preferably, the summation is not performed over every possible sample point within a receive slot, but is restricted to starting at the $65^{th}$ point and ending at $1494^{th}$, although other valued could be used. Numbering starts at zero. The accumulation is performed as:

$$\text{SUM\_MAG}_K = \sum_{j=5}^{114} (I_{k+13j})^2 + (Q_{k+13j})^2,$$

where k varies from 0 to 12.

After accumulation the mean of all the SUM_MAGs is subtracted from each $\text{SUM\_MAG}_k$ (where k goes from 0, . . . , 12). The SUM_MAG vector is then correlated to template 700. Template 700 is 26 points in length. The $k^{th}$ correlation is performed as:

$$Corr_k = \sum_{j=0}^{12} (temp_{k+j})(\text{SUM\_MAG}_k).$$

The k value giving the highest correlation peak represents the sample point that is closest to the information-bearing point. An interpolation scheme is used to further refine the symbol time estimate. Let M denote the index of the Symbol with the highest correlation peak. The interpolated index in terms of samples and fractions of a sample becomes INTERP+VAL=M−b/2$_o$, with $$b=(SUM\_MAG_{m-1}-SUM\_MAG_{m+1})/2$$

$$a=(SUM\_MAG_{m-1}+SUM\_MAG_{m+1})/2-SUM\_MAG_m.$$

If a=0, then INTERP_VAL=M.

It can happen that M is an end point (0 or 12) of the SUM_*MAGS* array. If M=12, then $SUM\_MAG_{M+1}$= $SUM\_MAG_0$. If M=0, then $SUM\_MAG_{M-1}$=SUM_ $MAG_{12}$. The SUM_MAGs array is interpreted in a modulo 13 fashion.

The preferred algorithm uses the value INTER_VAL to interpolate between samples to obtain an estimate of the symbol value. Quadratic interpolation places the index of the symbol value between M−1 and M or between M and M+1. Both the in-phase and quadrature-phase values are interpolated.

The interpolation for I and Q has the following form. If the index of the interpolated value is between M−1 and M+1 samples, the interpolated value is constructed by truncating to the lower integral sample value (which is N,N=integer value of INTER_VAL, DELT is fractional part of INTER_ VAL). The residual denoted by DELT is then used to interpolate the data by $$I_{IN}=(1-DELT)I_N+DELT\ I_{N+1},$$

$$Q_{IN}=(1-DELT)Q_N+DELT\ Q_{N+1},$$

where N can be either M or M−1, and subscript 'IN' denotes interpolated value.

Many of the features and functions discussed above can be implemented in software running on a digital signal processor or microprocessor, or preferably a combination of the two. Alternatively, dedicated circuits can be employed to realize the advantages of the above described preferred embodiments.

Moreover, while being described thus far in terms of a radio frequency system, the present invention may also be applied to any number of different applications. For example, the present invention may be applied to wireline systems, cable modems, two-way fiber optic links, and point-to-multipoint microwave systems.

Although the present invention and its advantages have been described in detail, it should be understood that various changes, substitutions and alternations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronizing with a transmitted signal, said method comprising:
   receiving said transmitted signal, wherein said transmitted signal comprises a periodic information bearing point at an information rate and wherein an information period is the inverse of said information rate;
   sampling said received signal at sample points at a sampling rate greater than said information rate, wherein a sample period is the inverse of said sampling rate;

filtering said sampled signal with a pulse-shaping filter;

measuring a variable of said filtered signal at said sample points, wherein said variable is independent of information content in said received signal;

determining the location of said information bearing point in said filtered signal based on said information content-independent variable; and synchronizing said filtered signal with said information bearing point, wherein said determining said location of said information bearing point comprises using a highest average energy point in said filtered signal as said information bearing point, and wherein said highest average energy point occurs between two of said sample points, and said determining said location of said information bearing point further comprises interpolating between sample points, and wherein said interpolating is performed using a quadratic equation fit on three of said sample points having three highest average energy values.

2. The method of claim 1, wherein said information content-independent variable is indicative of an average energy distribution of said received signal.

3. The method of claim 2, wherein said variable in an average energy.

4. The method of claim 3, wherein said filtered signal comprises an in-phase (I) component and a quadrature-phase (O) component, and wherein said average energy is calculated from a sum of the squares of said I and Q components.

5. The method of claim 2, wherein said variable is an average magnitude.

6. The method of claim 1, wherein said determining step further comprises using template matching over multiple sample points to locate said information bearing point.

7. The method of claim 1, wherein said information bearing point represents a symbol of information.

8. The method of claim 1, wherein said pulse-shaping filter meets Nyquist criteria.

9. The method of claim 8, wherein said pulse-shaping filter is part of a pair of matched filters.

10. The method of claim 1, wherein part of said filtering is performed before said receiving.

11. The method of claim 1, wherein said synchronizing is performed at signal acquisition.

12. The method of claim 1, wherein said synchronizing with said transmitted signal is performed continuously while said transmitted signal is being received.

13. The method of claim 1, wherein said transmitted signal is a wireless radio frequency signal.

14. A method for synchronizing with a transmitted signal, said method comprising:

receiving said transmitted signal, wherein said transmitted signal comprises a periodic information bearing point at an information rate and wherein an information period is the inverse of said information rate;

sampling said received signal at sample points at a sampling rate greater than said information rate, wherein a sample period is the inverse of said sample rate;

filtering said sampled signal with a pulse-shaping filter;

measuring a variable of said filtered signal at said sample points, wherein said variable is independent of information content in said filtered signal;

determining the location of said information bearing point in said filtered signal based on said information content-independent variable; and synchronizing said filtered signal with said information bearing point, wherein multiple values of said variable are collected over a period of time and accumulated in sample bins, wherein each respective sample bin represents a respective sample point collected at the same relative sample location within each said information period, and wherein said sampling rate is 52 kHz, said information rate is 4 kHz, having 13 of said sample periods per said information period, and having 13 of said sample bins.

15. A method for synchronizing with a transmitted signal, said method comprising:

receiving said transmitted signal, wherein said transmitted signal comprises a periodic symbol point having a symbol rate;

sampling said received signal at sample points having a sample rate greater than said symbol rate;

filtering said sampled signal with a pulse-shaping filter;

determining an energy level of each of said sample points;

averaging said energy level of said sample points over time based on a symbol period;

determining the location of said symbol point in said received signal based on said average energy level, wherein said average energy level is an information content-independent variable; and synchronizing said received signal with said symbol point, wherein said determining said location of said symbol point comprises interpolating using a quadratic equation fit based on three sample points having a highest average power.

16. The method of claim 15, wherein magnitude of said sample points is used to determine said energy level.

17. The method of claim 15, wherein power of said sample points is used to determine said energy level.

18. The method of claim 15, wherein said determining said location of said symbol point comprises selecting the sample point having a highest average energy level.

* * * * *